United States Patent [19]

Rathbun, Jr.

[11] 3,768,795
[45] Oct. 30, 1973

[54] LOOP SPRING SEAT SUSPENSION
[76] Inventor: Alan E. Rathbun, Jr., 3135 Highland Dr., Cuyahoga Falls, Ohio 44224
[22] Filed: Oct. 30, 1972
[21] Appl. No.: 302,116

[52] U.S. Cl.......................... 267/103, 5/237, 5/239, 5/247, 5/255
[51] Int. Cl............................................... F16f 3/00
[58] Field of Search.................... 5/237, 239, 241, 5/242, 247, 255; 267/86, 102, 103, 106

[56] References Cited
UNITED STATES PATENTS
| 118,782 | 9/1871 | Blakeney.......................... 5/247 UX |
| 359,070 | 3/1887 | Goewey................................. 5/255 |
| 2,267,472 | 12/1941 | Lieberman.............................. 5/247 |
| 3,498,598 | 3/1970 | Rathbun ............................ 267/103 |

FOREIGN PATENTS OR APPLICATIONS
132,171  6/1902  Germany ................................ 5/247

*Primary Examiner*—James C. Mitchell
*Attorney*—Hamilton, Renner & Kenner

[57] ABSTRACT

A spring seat suspension having a spring frame supported on a base, at least one end of said frame supported on a loop of flat spring metal having the bottom of the loop secured to said base. The upper ends of the loop are twisted laterally and secured together to form the loop into a collar and tie shape and the ends are secured to the frame at a location spaced laterally of the bottom connection with the base.

10 Claims, 9 Drawing Figures

Patented Oct. 30, 1973 3,768,795
3 Sheets-Sheet 2
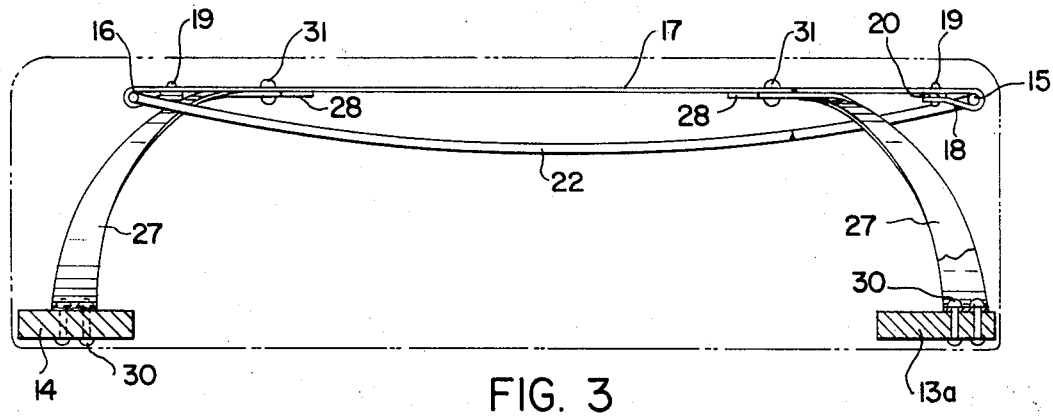
FIG. 3
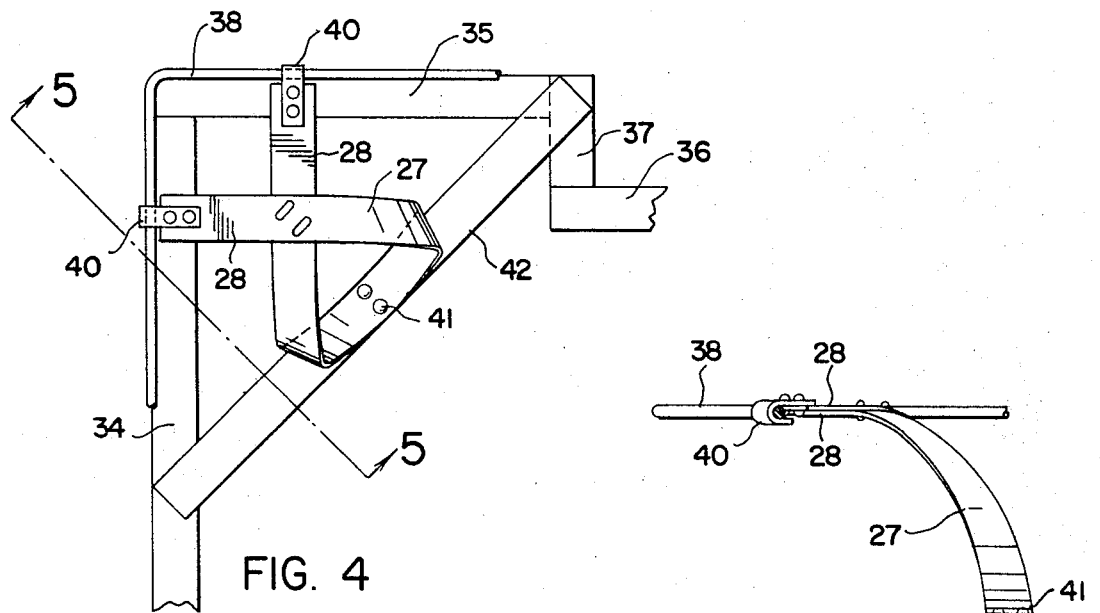
FIG. 4
FIG. 5
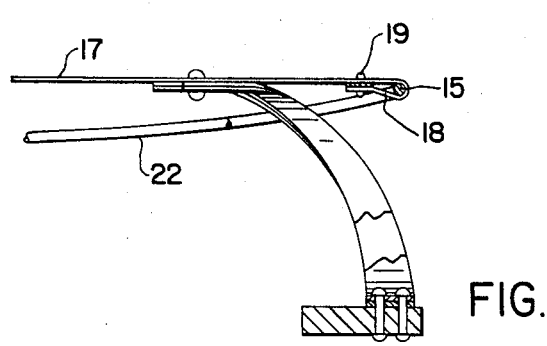
FIG. 9

LOOP SPRING SEAT SUSPENSION

BACKGROUND OF THE INVENTION

The invention relates to a spring suspension which gives a soft spring edge to a cushion seat while maintaining lateral stability.

Certain prior soft spring edge constructions have required either a deep foam support or coil springs. The foam material is expensive and tends to take a permanent set in use. Coil springs are also expensive as well as noisy and have to be pulled down with twine or wire when installed with a spring frame. In addition, in most spring seat constructions the spring elements require pre-stressing when they are attached to the spring frame.

In certain prior T-shaped spring seats the corners of the spring frame spaced above the base frame have been supported by coil springs sewed into the webbing of the base frame with the upper turn of the coil clipped to the border wire forming the corner portion of the spring frame. This construction requires pulling down the coil springs to make the front edge level, and it is very difficult to keep the coil springs axially aligned and the two corners level with each other.

SUMMARY OF THE INVENTION

It is an object of the present invention to provide an improved soft spring edge suspension for a spring seat which is vertically resilient and laterally stable.

Another object is to provide an improved loop spring which can be used to give a soft spring edge suspension at the front or rear of a seat, or both.

A further object is to provide an improved loop spring which can be used to give a soft spring edge suspension at the front corners of T-shaped spring seats.

Another object is to provide a loop spring unit which can be pre-stressed per se when manufactured and does not require pre-stressing when installed with a spring frame.

A still further object is to provide a novel and improved loop spring element which is simple and inexpensive to manufacture and adapted to provide a soft spring edge to a variety of spring seat suspensions.

BRIEF DESCRIPTION OF THE DRAWINGS

FIG. 3 is a sectional view on line 3—3 of FIG. 2.

FIG. 4 is a partial plan view of one corner of a T-shaped spring seat having the improved loop spring edge suspension.

FIG. 5 is a sectional view on line 5—5 of FIG. 4.

FIG. 9 is a partial sectional view similar to FIG. 3 showing another embodiment of loop spring edge suspension.

DESCRIPTION OF PREFERRED EMBODIMENTS

Figure 1:
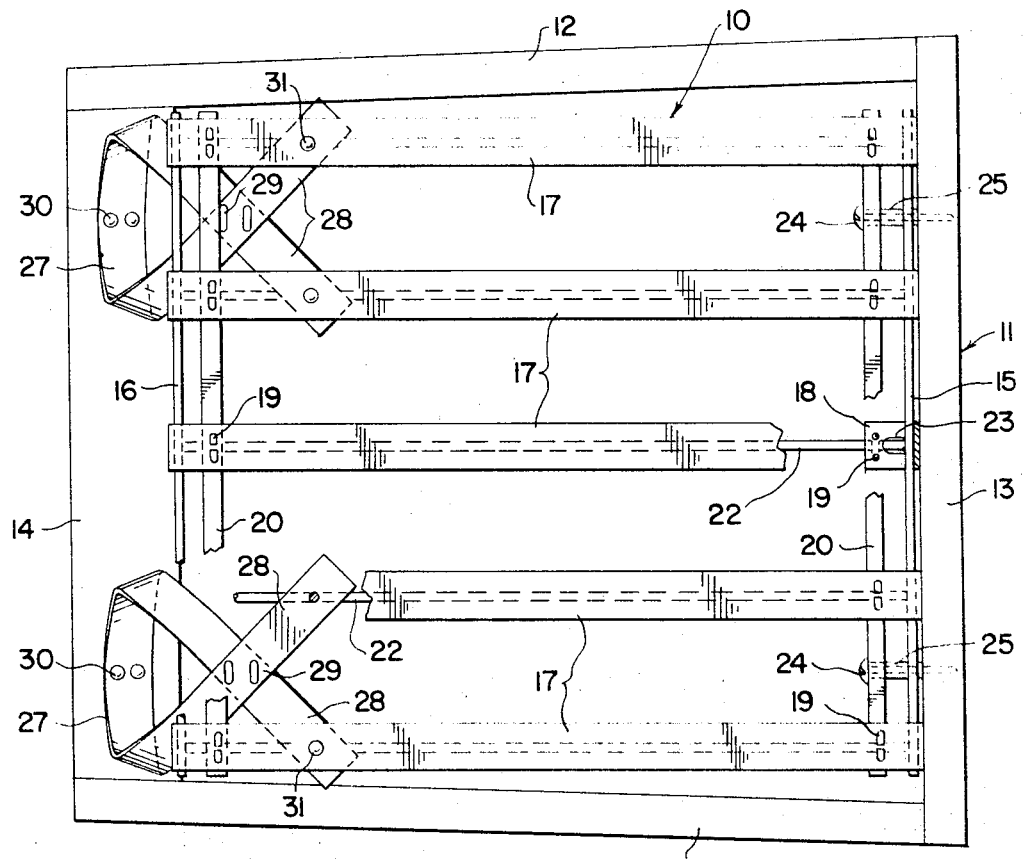
FIG. 1 is a plan view, partly broken away, of a preferred embodiment of a spring seat having the improved loop spring providing a soft spring edge suspension at one end.
Figure 2:
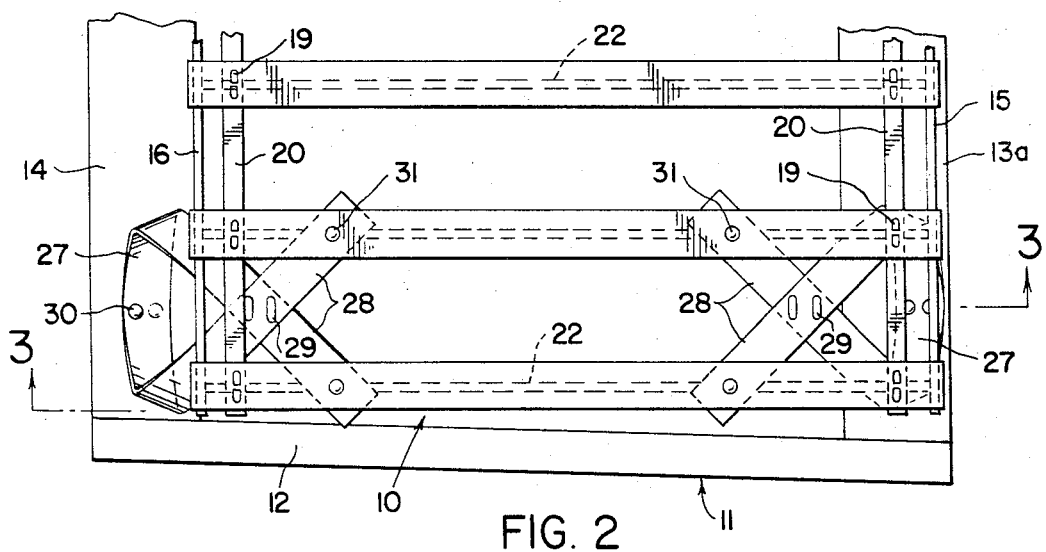
FIG. 2 is a partial plan view showing the improved loop springs at both ends of the spring seat.

Referring to FIGS. 1 - 5 and 7, the improved spring seat suspension includes a spring frame indicated as a whole at 10 supported on a rigid base frame indicated as a whole at 11. The base frame may include side bars 12 secured to a front cross bar 13 and to a bottom rear cross bar 14. In FIGS. 2 and 3, the front cross bar 13a is located at the bottom of the base frame for a purpose to be described.

The spring frame 10 preferably includes a front rod 15 extending transversely of the base frame and parallel to cross bar 13, and a rear transverse rod 16. Extending between the rods 15 and 16 are transversely spaced longitudinal webbing bands 17 of resilient non-extensible material such as thin tempered steel. The ends of the bands 17 are secured to rods 15 and 16 by wrapping the end portions around the rods and stapling or spot welding the overlapping portions together. The underlapping portions of the bands indicated at 18 are shown secured by staples 19.

Preferably, tapes or strips 20 of flexible plastic material connect the bands 17 at their front and rear ends and extend transvesely thereof. The tapes 20 may extend between the overlapping end portions of the bands so as to be secured thereto by the staples 19.

Bowed spring rod compression members 22 are provided at transverse intervals and extend longitudinally between the front and rear rods 15 and 16 with the ends of rods 22 abutting the rods 15 and 16 under sufficient pressure to bow the rods as indicated. The ends of the bowed rods may be received in slots 23 in the underlapping portions 18 of the bands, and may fit into notches in the rods 15 and 16 or may be welded thereto. One bowed rod 22 may be provided under each band 17 as shown, but the number and lateral spacing of the rods may vary.

The particular construction and arrangement of the spring frame 10 is shown and described in U.S. Pat. No. 3,498,598, and per se forms no part of the present invention which could be embodied in other forms of spring seat suspensions.

In FIG. 1 the front rod 15 of the spring frame 10 is shown slidably supported on studs 24 screwed into the front cross bar 13 of the base frame extending rearwardly therefrom. The studs preferably have plastic bearing sleeves 25 thereon slidably supporting the rod 15 and permitting some front to rear movement of the rod 15 as the spring frame flexes under load.

The rear end of spring frame 10 in FIG. 1 is supported on the novel loop springs of the present invention indicated at 27. The loop springs 27 are preferably made from flat spring steel and have their end portions 28 twisted laterally of the closed end of the loop, preferably crossing at substantially 90° to each other, and being secured together where they cross as by staples 29. However, the angle of crossing may vary if desired. The medial portion or closed end of the loop is secured to the bottom rear cross bar 14 of the base frame by suitable means such as bolts, screws or rivets indicated at 30. The end portions 28 of the loops extend beyond the crossing point a substantial distance and their outer ends are preferably secured to two adjacent bands 17 by rivets 31 or the like.

Thus, the outer ends of the loop springs are secured to the bands laterally of the connection between the closed end of the loop and the rear cross bar 14 or, expressed another way, forwardly of the connection between the closed end and the rear cross bar 14. Due to the fact that the loops are resilient spring steel and are laterally twisted with their ends secured together in what may be described as a collar and tie shape before being installed in the spring frame suspension, the loops are per se pre-stressed when fabricated and provide a vertically resilient laterally stable suspension when installed. The number of loops 27 may vary depending upon the number of bands 17. For example, with six bands 17 two or three loops 27 could be used.

Referring to FIG. 2, if a soft spring edge is desired at both front and rear ends of the spring frame, loop springs 27 are provided at the front end, in which case a bottom cross bar 13a is substituted for cross bar 13 and the closed ends of the loops secured thereto at points directly under the front rod 15 of the spring frame. Alternately, if a soft spring edge is desired at the front end only, loop springs 27 are provided to support the front end and the rear end is supported directly on the base frame.

The novel loop spring is adapted to be used to suspend the corner portions of a spring frame on a T-shaped base frame as shown in FIGS. 4 and 5. In this type of base frame the front corners formed by front frame members 34 and side members 35 project transversely outward of the side member 36 which is connected to frame member 35 by a transverse member 37. The spring frame has a right angled border wire 38 overlying the front corner of the base frame. A loop spring 27 is positioned laterally inward of the corner in the border wire 38 and has its outer ends 28 attached thereto by clips 40. The closed end of the loop may be secured at 41 to a diagonal base frame member 42 extending between member 34 and member 37. This construction is easily installed and since the loops are pre-stressed no tying down operations are required to maintain the front edge of the spring frame level.

Figure 6:
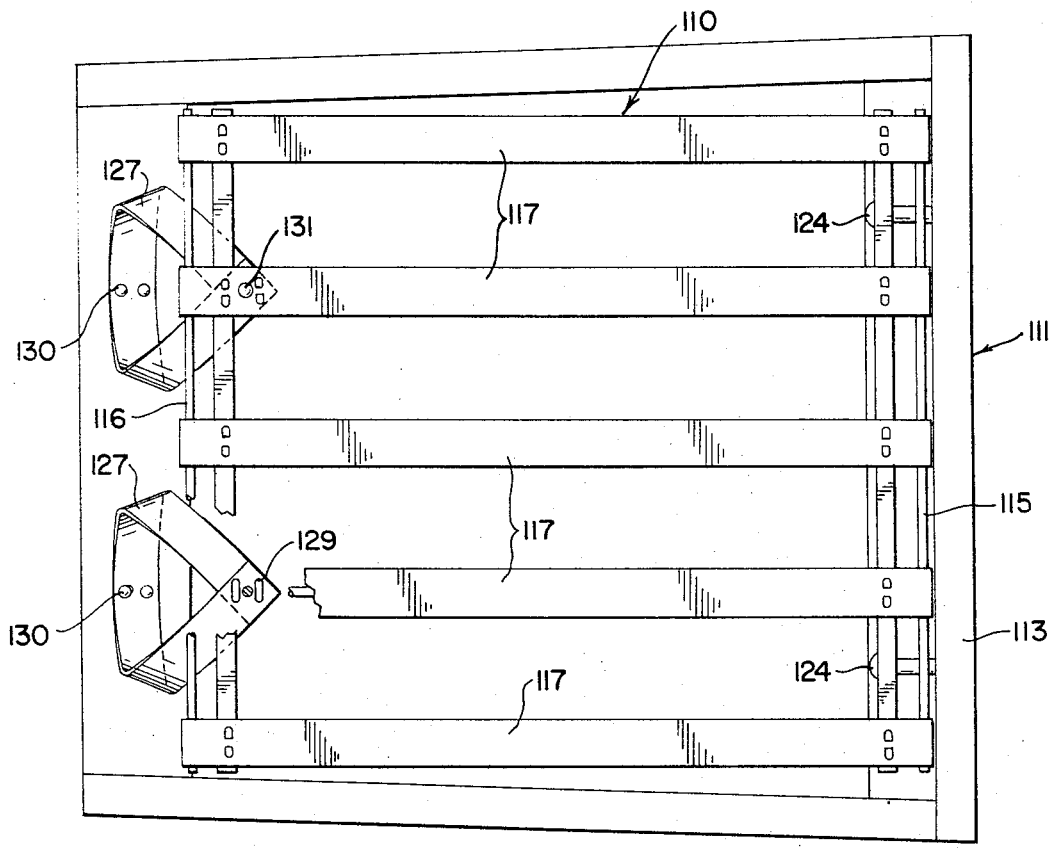
FIG. 6 is a plan view similar to FIG. 1, showing still another embodiment of loop spring edge suspension.
Figures 7, 8:
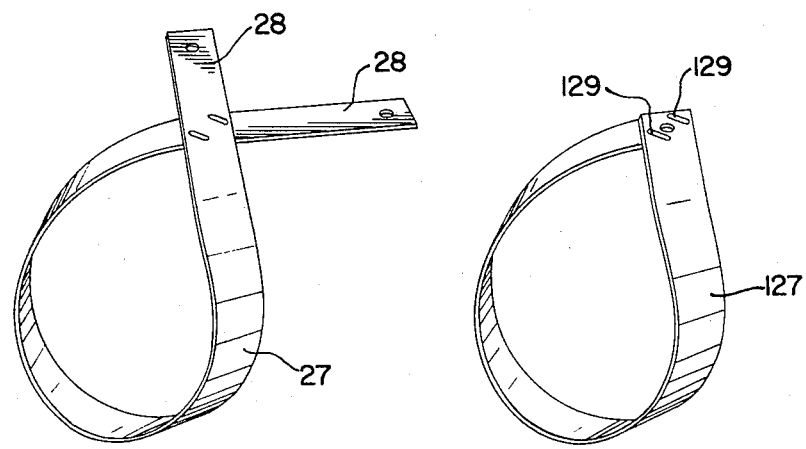
FIG. 7 is a perspective view of the loop spring in FIGS. 1 - 5.
FIG. 8 is a perspective view of the loop spring in FIG. 6.

In the embodiment of FIGS. 6 and 8, the loop springs 127 are formed in the same manner as the loop springs 27, that is, by twisting the end portions laterally of the closed end of the loop, crossing the ends substantially at 90° to each other and securing the overlapping ends by staples 129. However, the end portions do not extend beyond the crossing point.

Accordingly, in installing the loop springs 127 in a spring seat suspension having a spring frame 110 with transversely spaced bands 117 secured at their ends to front rods 115 and rear rods 116, the loop springs 127 are positioned so that the crossing points of the overlapping ends are aligned with the centerlines of certain of the bands. The overlapping stapled ends are secured to the aligned bands 127 as by rivets 131 and the closed ends of the loops are secured to the bottom rear cross bar 114 of the base frame 111 by bolts 130 at points spaced laterally of the connections 131. The front end of the spring frame 110 is supported by having the rod 115 rest on pins 124 extending rearwardly from the front cross bar 113 of the base frame. The number of loops 127 may vary depending upon the number and spacing of the bands 117.

Obviously, the loop springs 27 and 127 can be installed in inverted position with the closed end of the loop secured to a band 17 or 117 and the overlapping ends secured to a base frame member. In such case the loops 27 would be positioned so that their crossing points would be aligned with the bands 17 to which they are secured.

Where a stiffer spring suspension is desired two or more of the loop springs 27 or 127 can be laminated or nested one upon another and secured together, thus retaining all the advantages of the single loop. As shown in FIG. 9, two loop springs 27 are laminated one upon another with the closed ends of the double loop secured to the base frame member 13a and the extending ends 28 secured to adjacent bands 17.

It will be apparent that in all embodiments of the invention a simple and inexpensive spring seat suspension is provided which is vertically resilient and laterally stable, and which is pre-stressed when manufactured and does not require pre-stressing when installed. The novel spring loop suspension is adapted for providing a soft edge suspension at the front or rear, or both, of spring seats and at the corners of T-shaped seats.

I claim:

1. In a spring seat suspension comprising a base member and a spring frame member supported at its ends on said base member, at least one spring loop supporting at least one end of said spring frame member on said base member, said loop being formed of flat spring metal having its end portions twisted laterally and secured together in overlapping relation, the medial portion of said loop intermediate its ends being secured to one of said members, and the ends being secured to the other member laterally of the connection with said one member.

2. A spring seat suspension as in claim 1, in which the end portions of said loop continue beyond the point where they are secured together and are secured to the other member at their extreme ends.

3. A spring seat suspension as in claim 1, in which at least one spring loop supports at least one end of said spring frame member at the corner thereof, and said loop is positioned crosswise of said corner.

4. A spring seat suspension as in claim 2, in which at least one spring loop supports at least one end of said spring frame member at the corner thereof, and said loop is positioned crosswise of said corner.

5. A spring seat suspension as in claim 1, in which at least two spring loops are laminated one upon another and support at least one end of said spring frame member on said base member.

6. A spring seat suspension as in claim 2, in which at least two spring loops are laminated one upon another and support at least one end of said spring frame member on said base member.

7. A spring seat suspension as in claim 1, in which the end portions of the loop are substantially 90° to each other.

8. A spring seat suspension as in claim 2, in which the end portions of the loop are substantially 90° to each other.

9. A spring seat suspension as in claim 3, in which the spring loop has its medial portion secured to the base member inwardly of the corner of the spring frame.

10. A spring seat suspension as in claim 4, in which the spring loop has its medial portion secured to the base member inwardly of the corner of the spring frame and its ends secured to the spring frame corner border.

* * * * *